US012357940B2

(12) United States Patent
Roesling

(10) Patent No.: US 12,357,940 B2
(45) Date of Patent: Jul. 15, 2025

(54) VEHICLE CARBON CAPTURE SYSTEM

(71) Applicant: Ralph Roesling, San Diego, CA (US)

(72) Inventor: Ralph Roesling, San Diego, CA (US)

(73) Assignee: Ralph Roesling, San Diego, CA (US)

( * ) Notice: Subject to any disclaimer, the term of this patent is extended or adjusted under 35 U.S.C. 154(b) by 299 days.

(21) Appl. No.: 17/856,360

(22) Filed: Jul. 1, 2022

(65) Prior Publication Data

US 2024/0001289 A1    Jan. 4, 2024

(51) Int. Cl.
*B01D 53/14* (2006.01)
*B01D 46/00* (2022.01)
*B01D 53/04* (2006.01)

(52) U.S. Cl.
CPC ..... *B01D 53/1475* (2013.01); *B01D 46/0036* (2013.01); *B01D 53/04* (2013.01); *B01D 2257/502* (2013.01); *B01D 2257/504* (2013.01); *B01D 2257/7025* (2013.01); *B01D 2259/4566* (2013.01); *B01D 2259/4575* (2013.01)

(58) Field of Classification Search
None
See application file for complete search history.

(56) References Cited

U.S. PATENT DOCUMENTS

| 2006/0207234 A1* | 9/2006 | Ward | B01D 39/163 |
| | | | 55/524 |
| 2009/0145343 A1* | 6/2009 | Mauldin | C04B 18/08 |
| | | | 106/819 |
| 2014/0026750 A1* | 1/2014 | Jain | B01D 53/04 |
| | | | 95/114 |
| 2014/0260990 A1* | 9/2014 | Kwok | B01D 46/0036 |
| | | | 55/482 |
| 2018/0250619 A1* | 9/2018 | Celorio | B01D 46/0036 |
| 2019/0309455 A1 | 10/2019 | Cross et al. | |
| 2020/0289973 A1 | 9/2020 | Salehpoor | |

(Continued)

FOREIGN PATENT DOCUMENTS

| WO | WO 2020165048 A1 * | 8/2020 | ............ B01J 20/20 |
| WO | 2022006339 A1 | 1/2022 | |

OTHER PUBLICATIONS

World Intellectual Property Organization, Application No. PCT/US23/26817, International Search Report dated Oct. 23, 2023.

*Primary Examiner* — Jason M Greene
(74) *Attorney, Agent, or Firm* — Shield Intellectual Property PC

(57) ABSTRACT

A carbon capture system attached to a vehicle with an intake vent on the forward portion of the vehicle, the intake vent having a larger mouth leading to a smaller throat duct directing an incoming air stream thru a filter unit, the filter unit configured to pass the airflow through a filter matrix treated with a sorbent material for capture the carbon material in the airflow. The filter matrix can be formed from the filter fibers that can capture carbon within the fibers. The carbon laden fibers can be processed after capturing the carbon material by embedding the carbon laden fibers within a binding material to sequester than captured carbon material within a structural material. The fibers can include hybrid fibers that can capture carbon material and form structure fibers with the composite structural material. The structural material can include fiber concrete, fiber resins, fiber plastics, and other similar materials.

20 Claims, 13 Drawing Sheets

| CARBON MATERIAL 108 | AIR PRESSURE 124 |
| FILTER UNIT 110 | SORBANT MATERIAL 130 |
| FILTER BOX 112 | SOLID SORBENT 132 |
| FILTER MATRIX 114 | LIQUID SORBENT 134 |
| FILTER FIBERS 120 | DRIED SORBENT 136 |
| AIRFLOW DUCT 122 | CARBON LOADED MATERIAL 138 |

(56) References Cited

U.S. PATENT DOCUMENTS

| | | | |
|---|---|---|---|
| 2021/0061122 A1* | 3/2021 | Otsuki | B01D 53/0407 |
| 2021/0138395 A1* | 5/2021 | Pineda | B01D 46/0005 |
| 2021/0146287 A1* | 5/2021 | Thompson | B01D 46/0036 |

* cited by examiner

| CARBON MATERIAL 108 | AIR PRESSURE 124 |
|---|---|
| FILTER UNIT 110 | SORBANT MATERIAL 130 |
| FILTER BOX 112 | SOLID SORBENT 132 |
| FILTER MATRIX 114 | LIQUID SORBENT 134 |
| FILTER FIBERS 120 | DRIED SORBENT 136 |
| AIRFLOW DUCT 122 | CARBON LOADED MATERIAL 138 |

| CARBON MATERIAL 808 | CARBON LOADED MATERIAL 838 |
|---|---|
| BINDER 860 | SORBANT MATERIAL 830 |
| AGGREGATE MATERIAL 852 | SOLID SORBENT 832 |
| STRUCTURAL MATERIAL 872 | LIQUID SORBENT 834 |
| AGGREGATE FIBERS 872 | |

| FILTER UNIT 1410 |
| TOTAL FILTER AIR PRESSURE 1450 |

VEHICLE CARBON CAPTURE SYSTEM

TECHNICAL FIELD

Embodiments relate generally to systems for capturing carbon from ambient atmosphere on vehicles, and more specifically, to vehicle-based atmospheric carbon capture mechanisms and carbon capture processes for moving systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Since the advent of the industrial era, the utilization of hydrocarbon-based fuels for energy has resulting in the release of carbon compounds, including carbon monoxide and carbon dioxide, into the atmosphere. The resulting gradual change in the composition of the Earth's atmosphere has long been considered a source of concern. This includes concerns over the potential warming effects of the increasing levels of greenhouse gases. In addition, other gases such as methane also have a greenhouse gas effect.

Extensive efforts have been made to reduce the amount of carbon entering the atmosphere. These efforts include reducing the amount of hydrocarbons consumed for energy and transportation, burning hydrocarbon fuels more efficiently, switching to alternate sources of energy including renewable energy such as solar and wind energy, and other conservation and efficiency actions.

Carbon capture refers to materials, mechanisms, and systems to extract different types of these carbon compounds from the atmosphere and safely and securely sequester them in a manner to reduce the levels of atmospheric greenhouse gases and reduce the warming effects on the atmosphere.

The physical properties of carbon dioxide and other carbon-bearing compounds must be accounted for in any system for capturing the carbon from gaseous sources. In addition, the dilute nature of the carbon-bearing compounds in the Earth's atmosphere can make efficient systems paramount.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
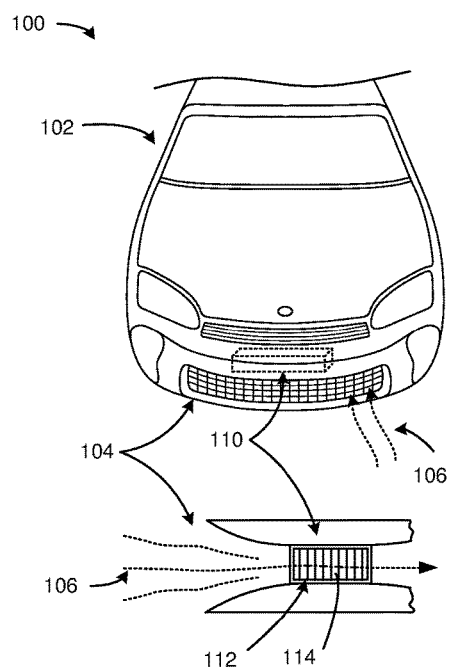
FIG. 1 depicts an embodiment of a carbon capture system.

In the following detailed description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0. Overview
 2.0. Structural Overview
 3.0. Implementation Mechanism
   3.1. Intake Vent
   3.2. Filter Unit
   3.3. Filter Matrix
   3.4. Filter Fibers
   3.5. Additional Vehicles
 4.0. Functional Overview
 5.0 Example Embodiments
 6.0. Extensions and Alternatives

1.0. OVERVIEW

Approaches, techniques, and mechanisms are disclosed for manufacturing and use of the carbon capture systems discussed herein including vehicle-based systems. The carbon capture systems can extract carbon materials, such as carbon dioxide, from an airflow generated by a moving vehicle. The carbon capture systems can use the volume of air traversing the cross-section of the vehicle in motion to drive the carbon capture mechanism. The carbon capture system can use the increased air pressure of the moving vehicle to improve the performance of the carbon capture materials. The carbon capture system can make use of different heat, motion, airflow, pressure, and electric properties of the vehicle system to operate the system.

The act of capturing the carbon materials can produce carbon-based residue products that can be used in a variety of ways. Carbon-containing residue can be sequestered within other materials for disposal or reuse. The structure of the carbon-capture materials can be configured to provide residue materials in different shapes, sizes, mechanical properties, and compositions. The different configurations of the carbon-based residue can be used for a variety of purposes including composite materials, sequestered materials, or other mechanical and structural materials.

Widespread use of carbon capture systems can help reduce atmospheric carbon levels by capturing the carbon in materials and structures that can be safely sequestered to remove the carbon from the atmosphere. Further, the deployment on diverse vehicles can be used to distribute the systems geographically and to provide improved performance based on the physical motion and operation of the vehicles.

According to one embodiment, the carbon capture system can comprise a carbon capture filter unit placed in an airflow resulting from the motion of a vehicle. The difference in surface areas between an intake vent and the size of the filter unit can increase the air pressure at the filter unit to improve the carbon capture process.

According to another embodiment, the carbon capture system can comprise a vehicle, such as an automobile, a light truck, a heavy truck, a train, an airplane, an aircraft, or other similar vehicles that can generate the airflow while in operation. The airflow can be channeled to the filter unit for carbon capture.

According to yet another embodiment, the carbon capture system can comprise the filter unit having a filter matrix formed with filter fibers and positioned in the airflow to capture atmospheric carbon material in a portion of the filter fibers. The filter fibers can be treated with a sorbent material to capture the carbon material. After primary operation, the filter fibers can be processed to form an aggregate material(s) to be used with a binder to form a structural material. The aggregate material can include the used filter fibers which can be used to sequester the carbon material in the structural material.

According to another embodiment, the carbon capture system can include the filter fibers and structural fibers to alter the mechanical properties of the aggregate materials and the resulting structural material. The structural fibers can be configured differently to provide improved tensile strength, compressibility, wear, and thermal properties.

In other aspects, the invention encompasses carbon capture systems configured to carry out the foregoing techniques.

2.0. STRUCTURAL OVERVIEW

FIG. 1 illustrates an embodiment of a carbon capture system 100. The carbon capture system 100 can be configured to operate with a vehicle 102 in motion. In this example, the carbon capture system 100 can include the vehicle 102 configured with an intake vent 104 directing an airflow 106 to a filter unit 110. The filter unit 110 can include a filter box 112 having a filter matrix 114 for collecting atmospheric carbon.

The vehicle 102 is a moveable device that can hold the filter unit 110 of the carbon capture system 100. The vehicle 102 can include automobiles, light trucks, heavy trucks, commercial trucks, trains, scooters, aircraft, or other mobile and moving devices. In some embodiments, the vehicle 102 can include mechanical devices with moving parts such as a windmill blade, an airfoil, or other mechanical structure that have motion relative to the airflow 106. In still other embodiments, the carbon capture system 100 can be a stationary unit positioned in an airflow, where the stationary unit is the structural equivalent of the vehicle. The different embodiments of the carbon capture system 100 can also include the components of the carbon capture system 100 using carbon laden exhaust directed to form the airflow 106. This can include diverting the exhaust from burning fuel into the filter unit 110. This can also include positioning the stationary unit in the exhaust of a fuel-burning system, such as a power plant.

The intake vent 104 is a mechanical structure for receiving external air and redirecting it to the filter unit 110. The intake vent 104 can be an opening, a scoop, a vent, or other similar openings in the body of the vehicle 102. The intake vent 104 can be configured to receive the external air and direct the airflow 106 to the filter unit 110. The intake vent 104 can have a physical shape configured to constrict the airflow 106 to increase the air pressure 124 at the exit to the intake vent 104.

In some embodiments, the airflow 106 can pass through an airflow duct 122. The airflow duct 122 is a channel to direct the airflow 106 to the filter unit 110. The airflow duct 122 can have a constricting configuration to also help increase the air pressure 124 as the duct reduces in diameter closer to the exhaust end. In an illustrative example, the intake vent 104 can be at the front of the vehicle 102 and the filter unit 110 can be positioned behind the intake vent 104 and coupled to the intake vent 104 with the airflow duct 122. In another illustrative example, the intake vent 104 at the front of the vehicle 102 and the filter unit 110 at the rear of the vehicle can be coupled together with the airflow duct 122, such as a tube or channel running from front to rear of the vehicle 102. This can allow for simplified access to the filter unit 110 to facilitate replacement and exchange of the filter matrix 114.

In other embodiments, the intake vent 104 can be positioned in different locations on the vehicle 102. For example, the intake vent 104 can be positioned in the front of the vehicle, on the sides, on the top, at the rear, under the vehicle, or in other locations or combinations of location where external air can be collected and diverted to the filter unit 110. The intake vent 104 can be coupled to the filter unit 110 in the different locations using one or more of the airflow ducts 122.

The intake vent 104 can be coupled to the filter unit 110 having the filter box 112. The filter unit 110 is a mechanical structure that can filter carbon dioxide out of the airflow 106. The filter unit 110 can be coupled to the vehicle in a variety of ways. For example, the filter unit 110 can be installed behind the intake vent 104 to facilitate receiving the airflow 106. The filter unit 110 can include auxiliary mechanical systems such as vanes, dividers, baffles, or other shaping devices to control the airflow 106. The airflow 106 can eventually exit the system from a discharge vent 123.

The filter box 112 is a mechanical structure that contains the filter matrix 114 having the filter fibers 120. The filter box 112 can be a removable mechanical structure installed within the filter unit 110. The filter box 112 can be configured such that the airflow 106 is directed through the filter box 112 to facilitate the acquisition of the carbon material. The filter box 112 can be removed from the carbon capture system to replace the sorbent material 130. The filter box 112 can be removed to harvest the captured carbon materials in the sorbent material 130. In an illustrative example, the carbon capture system 100 for an automotive vehicle can replace the filter box 112 during regular automotive servicing of the vehicle. In another illustrative example, the filter box 112 can be similar to a rectangular structure holding in place the filter matrix 114.

The carbon capture system 100 directs the ambient air from the intake vent 104 to the filter unit 110. The filter unit 110 can include the filter matrix 114 with sorbent materials 130 that can collect carbon materials from the airflow 106. In some embodiments, the exhaust from an engine, such as an internal combustion engine, can be directed into the airflow 106.

The filter matrix 106 is a permeable structure that can capture carbon material 108. For example, the filter matrix 106 can be a mesh, a grid, a 3D-printed porous structure, a mat, perforated sheets, a net, a laminate, or other similar materials that air can flow through. The carbon material 108 can be carbon dioxide, carbon monoxide, methane, or other carbon-containing materials.

In some embodiments, the filter matrix 106 can be formed with a variety of the filter fibers 120. The filter fibers 120 are structural elements that can hold a quantity of the sorbent 130 in any of a variety of forms including liquid, dry, foam, film, sheet, solid, or particulate form.

The filter fibers 120 can be attached to others of the filter fibers 120 to form the filter matrix 114. The filter fibers 120 can be woven together, spun, bonded together, pressed together, wound together, bonded with a binder or adhesive, tied together, or directly attached to the filter matrix 106 or the filter box 112. The sorbent material 130 can be applied to the filter fibers 120 before being formed into the filter matrix 114 or after being formed into the filter matrix 114.

The sorbent materials 130 are materials that can absorb liquids or gases using absorption, adsorption, or both. Absorption sorbents can assimilate the desired target molecules throughout the entirety of the sorbent material. Adsorption sorbents can accumulate the desired target molecules at the surface of the sorbent material. In some embodiments, the sorbent materials 130 can absorb carbon material 108, such as carbon monoxide, carbon dioxide, methane, or other carbon compounds and materials.

The sorbent materials 130 can be liquid or solid materials. Solid sorbents 132 used for carbon capture can include different porous, solid-phase materials including polymers, silicas, zeolites, amine impregnated solids, metal-organic framework materials, or a combination thereof. Other solid sorbents can include porous materials that can adsorb carbon dioxide through van de Waals interactions. The solid sorbents can also include nanotubes, particles, pellets, fibers, shaped elements, or other structures. The solid sorbents can have different physical structural forms including particles, micro-particles, fibers, rings, porous solids, and other similar structures.

In some embodiments, the liquid sorbents 134 can be utilized by applying the liquid to a carrier matrix such as fibers, sheets, porous solids, 3D printed structures, walls, vent interiors, or other such structures configured with larger surface to volume ratios or otherwise providing larger capture surface area. The liquid sorbent 134 can be dried in place, remain in a liquid or gel state, be suspended between structural elements, form a foam, form strands, or otherwise remain on or in the carrier matrix material. The liquid sorbent 134 can form a dried sorbent 136 embedded within the filter fibers 120.

In other embodiments, the sorbent material 130 can become a carbon loaded material 138 by capturing carbon dioxide and other carboniferous gases from the airflow 106. The carbon loaded material 138 can be a combination of the captured carbon in solid or liquid reacted forms, the sorbent material 130, the material of the filter matrix 114, or a combination thereof.

In some embodiments, the motion of the vehicle can create a pressure differential by compressing the incoming airflow using a combination of the intake vent 104 and the airflow duct 122. Alternatively, the airflows 106 of a plurality of the intake vents 104 can be combined to form a zone of increased air pressure 124.

In still other embodiments, the airflow 106 can be heated by directing it toward or through thermally hot areas of the vehicle 102. For example, the vehicle airflow 106 can be directed through or toward the engine, the brakes, a heat exchanger, portions of the exhaust system, portion of the cooling system, portions of the lubrication system, or other thermally active portion of the vehicle 102.

In one embodiment, the removable air flow system compressing and accelerating air to a carbon sequestration media, the grill and matrix can be replaced at car service intervals. This can include removing the filter unit 106, the filter box 112, the filter matrix 114, or the filter fibers 120.

Figure 2:
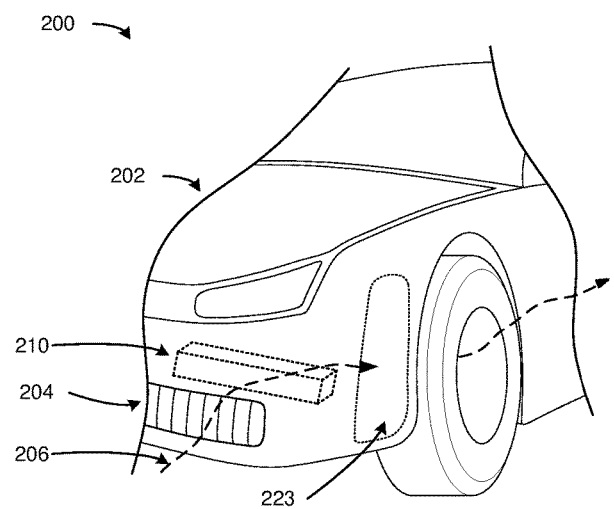
FIG. 2 depicts the right front portion of the vehicle in an embodiment of a carbon capture system.

FIG. 2 illustrates the right front portion of a vehicle 202 with an embodiment of a carbon capture system 200. An intake vent 204 can be positioned near the bottom portion of the front end of the vehicle 202. A filter unit 210 can be positioned behind the intake vent 204 and the airflow 106 can be directed through a discharge vent 223 to the wheel brake area to assist with cooling and thermal control of the brake system.

Figure 3:
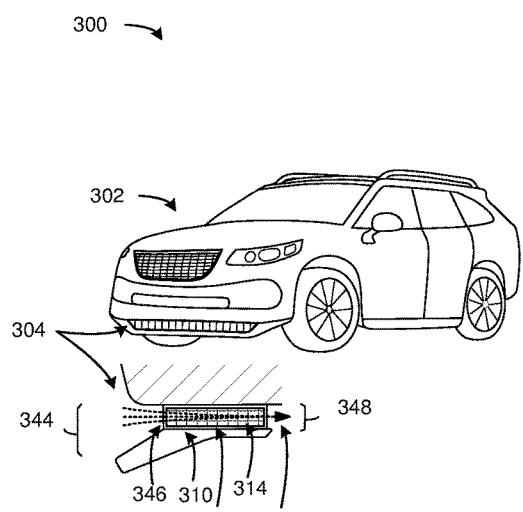
FIG. 3 depicts an embodiment of the carbon capture system.

FIG. 3 illustrates an embodiment of a carbon capture system 300. The carbon capture system 300 can include the intake vent 304 positioned at the bottom portion of the front end of a vehicle, such as an automobile 302. A filter unit 310 can be positioned behind the intake vent 304. In some embodiments, a chin spoiler can be retrofitted to improve performance.

In other embodiments, the filter unit 310 can receive an airflow 306 from the intake vent 304. The airflow 306 can pass through the filter matrix 314 and out the rear of the filter box 312. The filter matrix 314 can capture the carbon dioxide from the airflow 306. In this example, the carbon capture system 300 includes the automobile 302, the intake vent 304, and the filter unit 310. The motion of the vehicle, such as the automobile 302, can create the airflow 306.

In some embodiments, a front cross-section area 344 of the carbon capture system 300 can be larger than the filter cross-section area 346. The front cross-section area 344 is the area of the opening of the intake vent 304. The filter cross-section area 344 is the area of the front opening of the filter unit 310. The difference in the cross-section areas can result in a higher total air pressure at the filter unit 310 based on the motion of the vehicle 300. The compression of the airflow 306 as it moves from the intake vent 304 to the filter unit 310 can raise the total filter air pressure 350. The total air pressure can be a combination of the static air pressure and the dynamic air pressure.

In different embodiments, the carbon capture system 300 can use a ram-air intake configuration. The ram-air intake configuration is where the motion of the vehicle 302 causes an increase in dynamic air pressure component and can increase the static air pressure inside at the filter unit 310. The increased pressure at the filter unit 310 can improve the carbon capture performance of the sorbent material 330 in the filter matrix 314.

The increased air pressure at the filter unit 310 can alter the carbon capture operational properties of the sorbent material 330 of the filter matrix 314 having the filter fibers 320. Different sorbent materials 330 can have different reactions to different environmental properties including ambient pressure, temperature, presence of catalysts, thickness of sorbent materials, available surface area of sorbent materials, or other similar properties. It is understood that the carbon capture system 300 can have different operational configurations and can be configured to maximize performance based on the specific device types of the intake vent 304, the airflow 306, the filter unit 310, the filter box 312, the filter matrix 314, the filter fibers 320, and the sorbent material 330. In an illustrative example, the sizing of the intake vent 304 can be configured to alter the total air pressure at the filter unit 310 by changing the relative sizes of the front cross-section area 344, the filter cross-section area 346, and the cross-section of the airflow duct 322.

Figure 4:
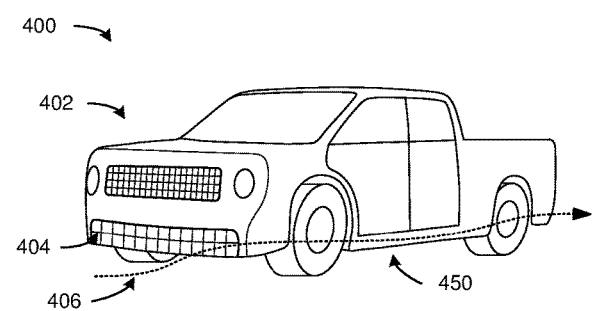
FIG. 4 depicts an embodiment of a carbon capture system with a truck.

FIG. 4 illustrates an embodiment of a having a carbon capture system 400 with a truck 402. The intake vent 404 can be positioned at the lower portion of the front of a vehicles, such as the truck 402. The carbon capture system 400 can have similar elements with similar names as in the carbon capture system 100. In this example, the carbon capture system 400 can include the truck 402 the intake vent 404, and a filter unit 410. The motion of the vehicle, such as the truck 402, can create an airflow 406.

In some embodiments, the truck 402 can be an electric vehicle having a battery pack 450 along the bottom of the truck 402. The airflow 406 can be directed to the battery pack 450 to provide additional cooling for the battery pack 450.

Figure 5:
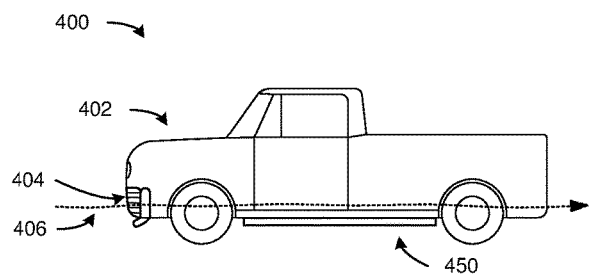
FIG. 5 depicts an embodiment of a carbon capture system with a truck.

FIG. 5 illustrates an embodiment of a carbon capture system 400 with a truck 402. The intake vent 404 can be positioned at the lower portion of the front of the vehicles, such as the truck 402. An airflow 406 can be directed through the filter unit 410 and over the battery pack 450. The battery pack 450 can have different configurations. for example, the battery pack 450 can extend the entire length of the truck, the length of the cab and the bed of the truck, the length of the bed of the truck, or a combination thereof.

Figure 6A:
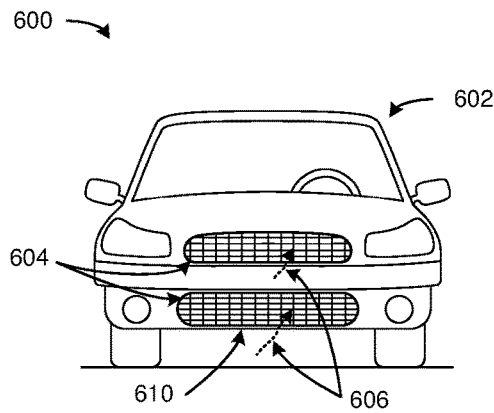
FIG. 6A depicts an embodiment of a carbon capture system with a plurality of airflows.

FIG. 6A illustrates an embodiment of a carbon capture system 600 with a plurality of airflows 606. The carbon capture system 600 can be configured with a vehicle 602 having a plurality of intake vents 604 directing the airflows 606 to one or more of the filter units 610.

The increase in the number of the airflows 606 in the carbon capture system 600 can improve performance in a variety of ways. For example, expanding the number of the airflows 606 can increase the total volume of air being processed to capture carbon, the different airflows 606 can have paths that take advantage of other components in the vehicle 602, and the different airflows 606 can accommodate the physical limitation and configuration of the vehicle 602.

In some embodiments, the plurality of the intake vents 604 can direct the airflows 606 to one or more of the filter units 610. The aggregation of the airflows 606 at one of the filter units 610 can increase the air pressure at the filter units 610.

Figure 6B:
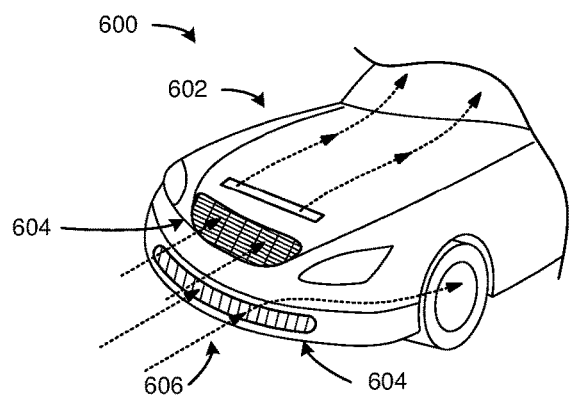
FIG. 6B depicts an embodiment of the carbon capture system with two of the intake vents.

FIG. 6B illustrates an embodiment of the carbon capture system 600 with two of the intake vents 604. In other embodiments, the path of the airflows 606 can be directed to take advantage of other vehicle components to improve the performance of the carbon capture system 600. In an illustrative example, the carbon capture system 600 can have one of the intake vents 604 located at the bottom of the front end of the vehicle 602 and another one of the intake vents 604 located in the middle of the front of the vehicle 602. The lower of the intake vents 604 can direct the airflow 606 through a lower filter unit and toward the brakes to assist with additional cooling. The upper intake vent 604 can be directed through a second filter unit and discharged over the hood of the vehicle 602. In some configurations, this can create a lower pressure zone that can help direct the airflow 606 through the filter unit 610.

Figure 6C:
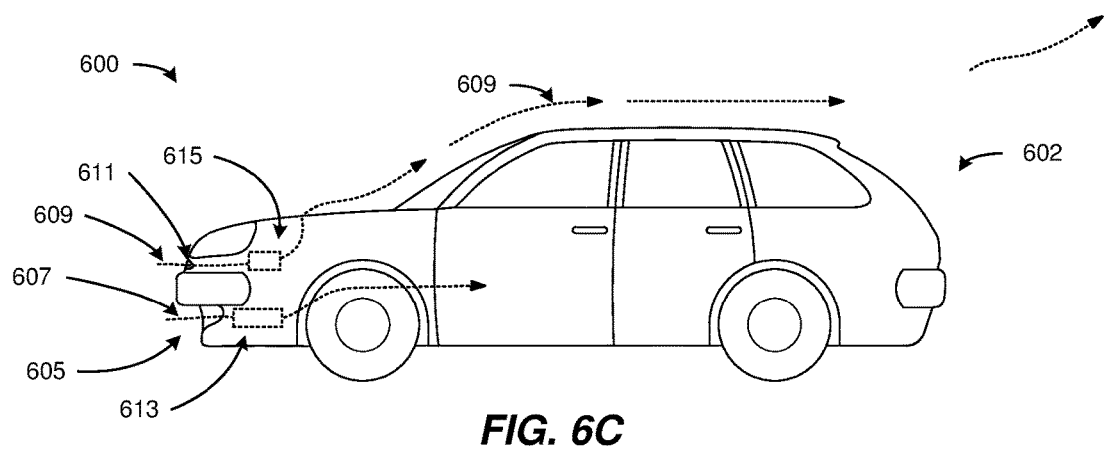
FIG. 6C depicts a side view of an embodiment of the carbon capture system with two of the intake vents.

FIG. 6C illustrates a side view of an embodiment of the carbon capture system 600 with two of the intake vents 604. A lower airflow 607 can enter the lower intake vent 605 positioned at the bottom of the front of the vehicle 602. An upper airflow 609 can enter the upper intake vent 611 positioned above the lower intake vent 605.

In an embodiment, the lower airflow 607 can pass through the lower filter unit 613 and then be directed to the braking system for cooling. The upper airflow 609 can pass through the upper filter unit 615 and exit the system from an upper exit vent and flow over the top of the vehicle 602.

Figure 7:
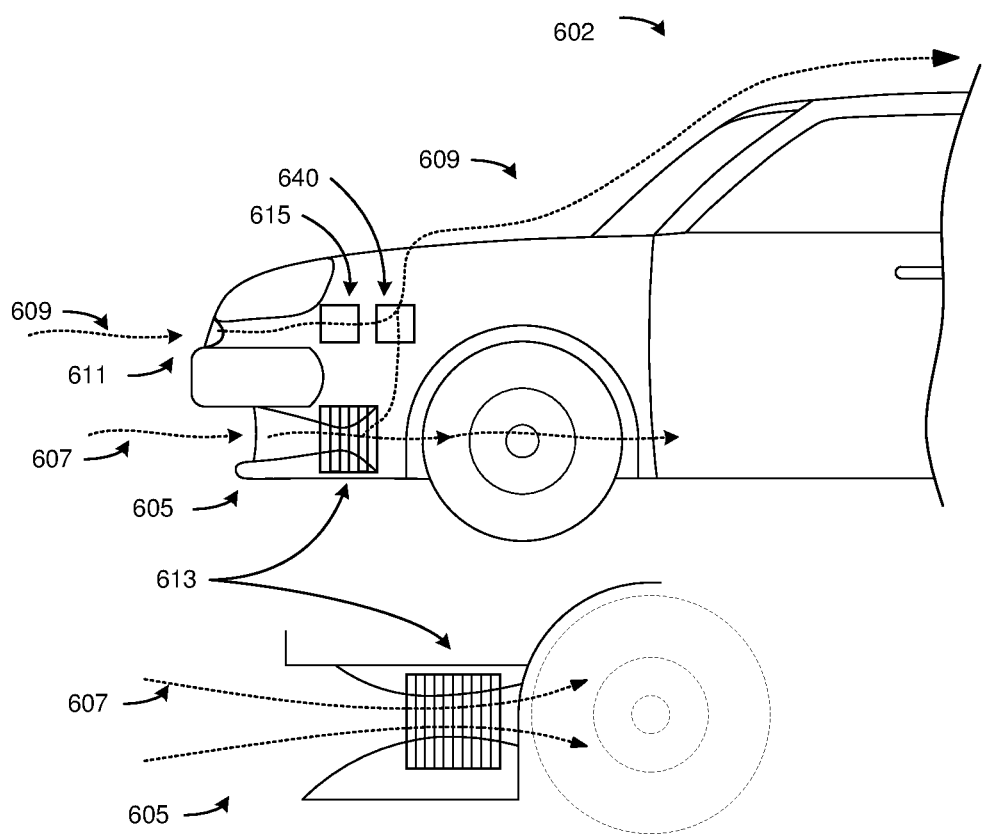
FIG. 7 depicts a side view of the carbon capture system with two of the intake vents.

FIG. 7 illustrates a side view of the carbon capture system 600 with two of the intake vents 604. The lower airflow 607 can enter the lower intake vent 605 positioned at the bottom of the front of the vehicle 602 and the upper airflow 609 can enter the upper intake vent 611 positioned above the lower intake vent 605. The lower airflow 607 can be directed at the braking system to provide a cooling effect. The upper airflow 609 can be directed over the hood and the windshield of the vehicle 602 taking advantage of the lower pressure at that location.

In another embodiment, the lower airflow 607 and the upper airflow 611 can be combined in a filter manifold 640 ahead of the filter unit 610. The filter manifold 640 is a mechanical element that can combine two or more physical inputs at a chamber. Alternatively, the manifold can distribute one input into two or more outputs. This can increase the air pressure before entering the filter unit 610. In some embodiments, the filter manifold 640 can join several different airflows together. The filter manifold 640 can be configured to operate in a resonant configuration that can increase the pressure at the filter unit 610, such as the upper filter unit 615. The filter manifold 640 or other components along the airflow 606 can include active and passive elements to modify the resonant configuration and dynamically adjust to the incoming airflow 606. In some embodiments, the lower airflow 607 and the upper airflow 611 can be mixed together at the filter manifold 640. In another embodiment, the filter unit 610, such as the lower filter unit 613 or the upper filter unit 615, can include the filter matrix 614 having multiple layers.

3.0. IMPLEMENTATION MECHANISM 3.1. Intake Vent

Figure 8A:
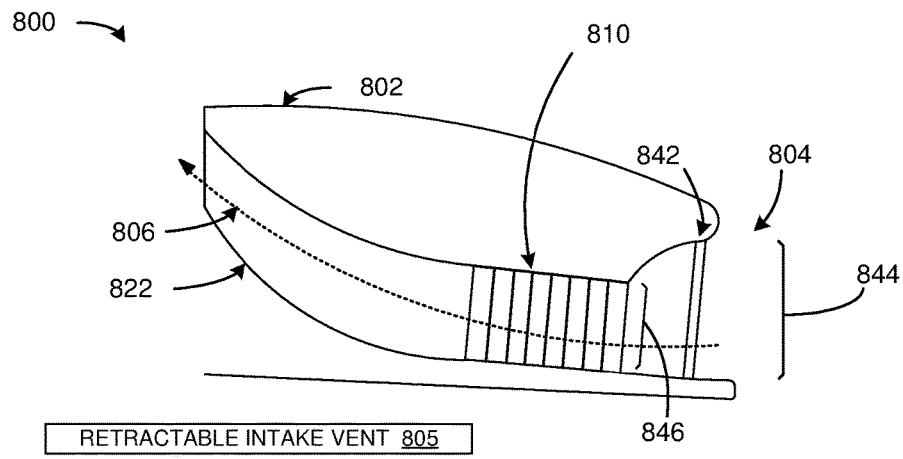
FIG. 8A depicts an intake vent of a carbon capture system.

FIG. 8A illustrates an intake vent 804 of a carbon capture system 800. The intake vent 804 can direct the exterior air entering the system and direct an airflow 806 to a filter unit 810 for capturing the carbon. the carbon capture system 800 can include a vehicle, the intake vent 804, and the filter 810. The motion of the vehicle can generate the airflow 806.

The intake vent 804 can have a variety of configurations based on the vehicle used and the performance levels desired. In an embodiment, the intake vent 804 can be an opening at the lower portion of the front end of the vehicle 802. The intake vent 804 can extend across the width of the vehicle 802 to increase the amount of air that can be directed to the filter unit 801.

In another embodiment, the intake vent 804 can be configured as a scoop mechanism open in the forward facing direction of the vehicle 802 as determined by primary direction of travel. Moving the vehicle 802 and the intake vent 804 in the forward direction can drive the external air into the intake vent 804.

In other embodiments, the intake vent 804 can be other structures that allow the entrance of external air into the carbon capture system 800. The intake vent 804 is configured to allow the motion of the vehicle 802 to drive exterior air into the system. In some configurations, the motion of the vehicle 802 can cause an increase in the air pressure in the system.

The intake vent 804 can be coupled to the filter unit 810 in a variety of ways. In some embodiments, the intake vent 804 can be directly adjacent to the entrance of the filter unit 810, coupled to the filter unit 810 via an airflow duct 822.

The intake vent 804 can be configured with a front cross-section area 844 that is larger then a filter cross-section area 846 at the entrance of the filter unit 810. The narrowing between the front of the intake vent 804 and the rear of the intake vent 804 can increase the air pressure 824 at the filter unit 810.

In some embodiments, the intake vent 804 can be configured as an opening, an opening with an exterior shell, an air scoop, or other similar structural elements. The leading edge of the intake vent 804 can be aerodynamically formed to efficiently direct the airflow 806 to the filter unit 810.

In other embodiments, the intake vent 804 can be dynamically adjustable and can open when the vehicle 802 is in motion. In the closed configuration, the airflow 806 can be directed away from the filter unit 810.

In some embodiments, the intake vent 804 can be a retractable intake vent 805. The retractable intake vent 805 is a movable mechanical element that can open to allow the influx of the airflow 806. The retractable intake vents 805 can extend or flip open during operation to facilitate directing the airflow 806 to the filter unit 810. The retractable intake vent 805 can be retracted or flipped down when not in use to improve the aerodynamic profile of the vehicle 802.

In an embodiment, the operation of the carbon capture system 800 can have the retractable intake vents 805 can direct the airflow 806 to the filter unit 810 either directly or via an airflow duct 822. The filter unit 810 can be located below the retractable intake vent 805 and within the body of the vehicle 802.

In some embodiments, the filter unit 810 can be protected from debris and other foreign matter with a protective grill 842. The protective grill 842 can be installed over or within the intake vent 804. The protective grill 842 can be a screen, grill, or grid that can prevent the entry of foreign materials from the intake vent 804. The protective grill 842 can be formed from metal, plastic, resin, thermoplastic, ceramic, or other materials.

3.2. Filter Unit

Figure 8B:
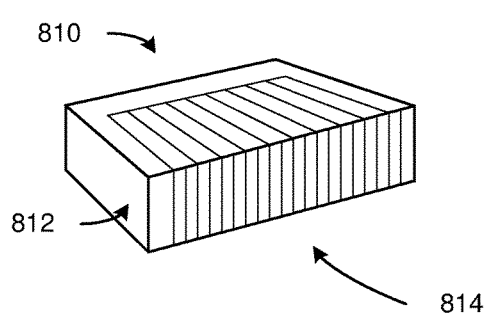
FIG. 8B depicts an embodiment of a filter unit.

FIG. 8B illustrates an embodiment of the filter unit 810. The filter unit 810 can be a structural element that includes a filter box 812 having a filter matrix 814. The filter unit 810 is positioned behind the intake vent 804 and receives an airflow 806. The filter unit 810 can be attached to the vehicle 802 such that the filter box 812 can be accessed and removed when needed.

In some embodiments, the filter unit 810 can be protected from debris and other foreign matter with a protective grill 842. The protective grill 842 can be installed over or within the intake vent 804. The protective grill 842 can be a screen, grill, or grid that can prevent the entry of foreign materials from the intake vent 804. The protective grill 842 can be formed from metal, plastic, resin, thermoplastic, ceramic, or other materials.

The filter unit 810 can include other subsystems related to the operation of the carbon capture system 800. In some embodiments, the filter unit 810 can include mechanisms for attaching to the vehicle 800, vanes and other mechanisms for directing and channeling the air flow 806, heating elements for modifying the temperature of the components of the filter unit 810, and other similar active and passive subsystems.

The filter unit 810 can include elements to hold the filter box 812 in place. The filter box 812 can be a structural component for holding the filter matrix 814. The filter box 812 can be attached to the filter unit 810 using a variety of techniques. In an embodiment, the filter box 812 can include a structural shell to hold the filter matrix 814. For example, the structural shell can be plastic, metal, cardboard, or other structural materials. the structural shell can be sized to form an airtight seal when installed in the filter unit 810. The filter box 812 can include electrochemical plates for carbon capturing.

In an illustrative example, the filter box 812 can be a plastic or cardboard box holding the filter matrix 814. The filter box 812 can have a frame that can be used to attach the filter box 812 to the filter unit 810. For example, the filter box 812 can be attached with screws, snaps, rivets, bolts, adhesive, tabs and slots, pressure fastening, or other similar fastening techniques. The filter box 812 can be removed from the filter unit 810 and replaced at regular or irregular intervals, such as regular service intervals. The filter box 812 can be removed after the filter matrix 814 has captured an amount of carbon and carbon byproducts from the air. The carbon material 808 can be held by the material of the filter matrix 814.

3.3. Filter Matrix

Figure 8C:
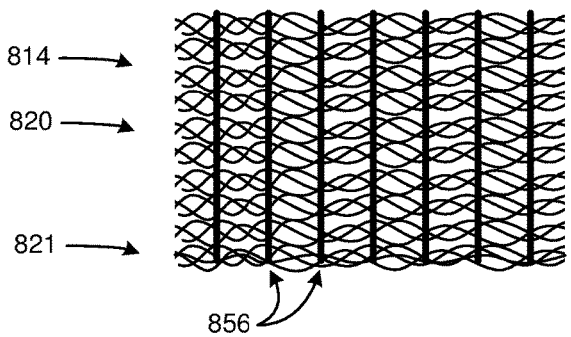
FIG. 8C depicts an embodiment of the filter matrix.

FIG. 8C illustrates an embodiment of the filter matrix 814. The filter matrix 814 is the body of the filter box 812 and holds the sorbent material 806 that can capture the carbon material 808. The airflow 806 can be directed at the filter matrix 814 to enable the capturing of the carbon material 808 by the sorbent material 830.

The filter matrix 814 forms the body of the filter unit 804 and can be positioned within the structural shell of the filter box 812. The filter matrix 814 can have a variety of configurations. In some embodiments, the filter matrix 814 can be a plurality of sheets of carrier material, a woven mat of carrier fibers, one or more layers of a porous structure formed from solid sorbent, a structure of one or more fiber types, an aerogel material, a foamed material, a sponge-like material, a 3D-printed porous structure, or a combination thereof. The filter matrix 814 is a structure for interacting with the airflow 806 to capture a carbon material 808.

In some embodiments, the filter matrix 814 can include the sorbent material 830 to allow the capture of the carbon material 808. The filter matrix 814 can have a porous configuration, a breathable configuration, a solid configuration, or a combination thereof. The sorbent material 830 can have a liquid, solid, film, or gel configuration. The sorbent material 830 can capture the carbon material 808 on the surface of the filter matrix 814, within the body of the filter matrix 814, or a combination thereof.

In some embodiments, the filter matrix 814 can be formed from the filter fibers 820. The filter fibers 820 can be pressed together to form a mat-like structure, woven together, bonded together, assembled into complex patterns, or formed using other similar techniques. The filter fibers 820 are described in detail below. The filter fibers 820 can be bound together using reinforcement fibers 856. The reinforcement fibers 856 can be coupled to the filter fibers 820 at different angles. For example, the reinforcement fibers 856 can be attached to the filter fibers 820 at 90 degree angles, 45 degree angles, 30 degree angles, or any angle value between 5 and 90 degrees. The filter fibers 856 can be intertwined with the reinforcement fibers 856 at an intersection point. In some embodiments, the reinforcement fibers 856 can have different diameters than the filter fibers 820. The reinforcement fibers 856 can be smaller, the same diameter, or larger than the filter fibers 820. The reinforcement fibers 856 can act as absorbent fibers, structural fibers, hybrid fibers, aggregate fibers, or other similar fiber types. In some embodiments, two or more types of the reinforcement fibers 856 can be used to reinforce the filter matrix 814. The two fiber types can be aligned at different angles to the filter fibers 820 to form a reinforcement grid structure.

In other embodiments, the filter matrix 814 can be formed by 3D printing the sorbent material into a solid sheet with openings or passage within the sheet to provide access to the airflow 806. The sheets of the filter matrix 814 can be configured so the opening between sheets are at the same relative location to facilitate the assembly of multiple sheets that have openings that correspond to one another to form longer passages for airflow.

In yet other embodiments, the filter matrix 814 can be treated with the sorbent material 830 to fix an amount of the sorbent material 830 within the filter matrix 814. Because the filter matrix 814 is a porous and breathable structure, the airflow 806 can pass through the filter matrix 814 and the sorbent material 830 can capture the carbon material 808.

In different embodiments, the sorbent material 830 can applied to the filter matrix 814 itself or applied to the individual filter fibers 820 and then formed into the filter matrix 814. In yet other configurations, the filter matrix 814 can be formed directly from the solid material 832 by mechanically forming the porous structure using weaving, drilling, etching, 3D printing, spinning, or other manufacturing techniques.

In some embodiments, the filter matrix 814 can be configured to receive an electric current from the vehicle 802 to facilitate an electrochemical reaction with the sorbent material 830. The sorbent material 830 can be configured to discharge the carbon material 830 when a charge is applied. In an alternative embodiment, the filter matrix 814 and the sorbent material 830 can be heated electrically to modify the properties of the carbon capture process. The sorbent material 830 can be configured to discharge the captured carbon material 830 when heated.

3.4. Filter Fibers

Figure 8D:
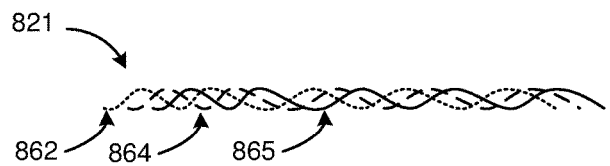
FIG. 8D depicts an embodiment of the filter fibers.

FIG. 8D illustrates an embodiment of the filter fibers 820. The filter fibers 820 are individual strands of material that can be combined to form the filter matrix 804. The filter fibers 820 are structural elements that can hold a quantity of the sorbent 806 in liquid, dry, or particulate form and can be configured to provide other mechanical properties such as stiffness or tensile strength.

In an embodiment, a liquid sorbent 804 can be applied to the filter fibers 820 resulting in a liquid or dry residue bonded to the filter fibers 820. The filter fibers 820 can be formed from a fibrous or porous material that can hold an amount of the sorbent material 830 and can be used to absorb a quantity of atmospheric carbon, typically carbon dioxide, although the filter fibers 820 and the sorbent material 830 can be configured to absorb different carbon-containing materials, such as carbon monoxide, methane, other hydrocarbons, or other similar materials.

In other embodiments, the filter fibers 820 can be directly formed from a solid sorbent 832 material that has been spun or otherwise formed into fibers. Alternatively, the solid sorbent 832 can be formed into porous shapes, 3D printed into breathable structure, formed into hollow open-ended structures, or formed into other structure to increase the surface area to allow for carbon capture by the solid sorbent 832.

In other embodiments, the filter matrix 804 can be configured to include a blend of different filter fiber types to provide a variety of material properties. A composite thread, such as a filter thread 821, can include at least a first fiber 862 combined with a second fiber 864. In some embodiments, the filter thread 831 can include a different number and type of fiber types, such as the first fiber 862, the second fiber 864, and a third fiber 865.

In some embodiments, the filter thread 821 can include the first fiber 862 that can be an absorbent material, such as material similar to woven cotton fibers, that can hold an amount of the sorbent material 830. The amount of the sorbent material 830 can be determined by the length, diameter, and composition of the fibers. The filter thread 821 can also include the second fiber 864 to provide a different primary property, such as stiffness, flexibility, tensile strength, or other properties. In another example, the second fiber 864 can be glass fibers, metal fibers, synthetic fibers, cellulose, plant fibers, plastic fibers, or other types of fibers. The fibers can have different shapes, including shapes to help interlock and connect the fibers. For example, the fibers can have a hook-shape at one or both ends to help couple to other fibers. In an illustrative example, the fibers can have an interlock shape such as a hook, an angular bend, a spiral, a helix, a multi-armed form, or a combination thereof. The interlock shape can help the fibers connect and interlock with one another. In another example, different types of the fibers can have different shapes such as one fiber type being linear and another fiber type being bent or hook shaped.

The first fiber 862 and the second fiber 864 can be combined to form the filter thread 821 having the absorbent properties of the first fiber 862 and the tensile strength of the second fiber 864. The first fiber 862 and the second fibers 864 can be combined in a variety of ways. The fibers can be woven together, bonded together, held together with a cross-stitch, be inserted one inside a hollow structure of the other, or similar methods of combining and attaching fibers together.

In some embodiments, a third fiber 865 can be included in the filter thread 821 to help configure the properties of the filter thread 821. For example, the third thread 865 can be an additional absorbent fiber 866 to improve the carbon carrying capacity of the filter thread 821. The third fiber 865 can also be configured with a different type of sorbent material to help capture other specific materials such as nitrogen compounds, alternative carbon compounds, other elemental compounds, metals, organic molecules, or other targeted materials. The third fiber 865 can also be configured to provide a different physical property to the filter thread 821 such as thermal stability, flexibility, hardness, or other properties.

In an illustrative example, the filter fibers 820 can be woven together to provide a given length of the filter thread 821 that can both absorb the carbon material 808 and provide a thread having an improved property, such as increased tensile strength. This can result in the filter threads 821 that can be used to store carbon material in the absorbent fibers 866 and provide structural strength with the structural fibers 868 and be mixed or embedded with concrete or other building materials to form a composite material that can hold carbon material in the concrete material and provide a fiber cement-like composite fibrous material from increasing the flexural strength and toughness of the concrete.

In an embodiment, the filter fibers 820 can be configured to break at certain points to provide a more uniform length of the filter fibers 820. In some cases, the filter fibers 820 can be pre-cut, bent, notched, or otherwise marked to break at a certain point. In other embodiments, the filter fibers 820 can simply be cut to different lengths during post-processing when the filter matrix 814 is cut to form the aggregate material 852. However, it is understood that the materials can be configured to have different lengths for the absorbent fibers 866 and the structural fibers 868. In some cases, additional fibers and aggregate materials can be added to the structural material.

In yet other embodiments, the filter matrix 814 can be configured to capture and hold the carbon material 808 in different ways. When sufficient amounts of the carbon material 808 have been captured, the filter matrix 814 can be removed, processed, and sequestered to keep the carbon material 808 out of the atmosphere. When the sorbent material 830 has captured the carbon material 808 it can become a carbon loaded material 838 that can be processed into an aggregate material 852, such as aggregate fibers 872.

In an embodiment, the carbon loaded material 830 can be processed by dicing, chopping, crushing, or otherwise processed into fragments and used for a composite material(s) with a suitable binder 860. This can include using the fragments of the carbon loaded material 830 as aggregate for a concrete-based material using cement as the binder 860.

The carbon loaded material 838 can be sequestered by combining the aggregate material 852 with the binder 860 to form a structural material 854, such as concrete. The binder 860 is a material or substance that can hold other materials together to for a cohesive whole. The binder 860 can include glues, cement, adhesives, thickening agents, bitumen, polymers, lime, gypsum, liquid glass, or other similar substances.

The structural material 854, such as concrete, can be used for forming structural elements including blocks, bricks, panels, walls, roads, platforms, pads, or other similar elements. By using the carbon loaded material 838 as an aggregate material 852, the captured carbon can be sequestered and kept out of the atmosphere for long periods of time.

In another embodiment, the aggregate material 852 can include fibers from the sorbent materials and the structural materials of the filter matrix 814. This can include absorbent fibers 866, structural fibers 868, and hybrid fibers 870. The absorbent fibers 866 can capture the carbon loaded material 838 and be used to sequester the captured carbon. The structural fibers 868 can be used to reinforce the structural material 854 and provide a strong and durable structural material 854. The hybrid fibers 870 can be a mix of component types to provide additional functionality such as capturing other materials, provide thermal resilience, provide physical size components, increase mechanical stability, or other properties. The hybrid fibers 870 can include multiple types of other fibers including inert fibers, sorbent fibers, and structural fibers.

3.5. Vehicle Configurations

Figure 9:
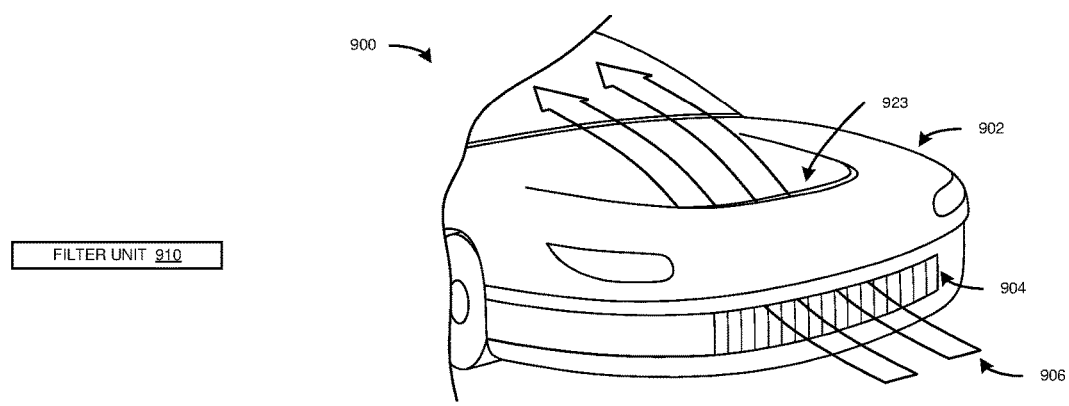
FIG. 9 depicts an embodiment of a carbon capture system for a vehicle having an intake vent and a discharge vent.

FIG. 9 illustrates an embodiment of a carbon capture system 900 for a vehicle 902 having an intake vent 904 and a discharge vent 923. The intake vent 904 can be positioned at the lower portion of the front of the vehicle 902. The discharge vent 923 can be positioned to discharge the airflow 906 over the hood of the vehicle 902.

In an embodiment, the incoming air can be compressed at the intake vent 904, such as a chin spoiler, and directed to the carbon capture filter unit 910 integrated into the aerodynamics of the vehicle 902. In some configurations, the incoming air can result in a down force at the front wheels of the vehicle 902. The vehicle 902, such as an automobile, a light truck, a heavy truck, a train, an aircraft, an airplane, or other similar vehicles that can generate the airflow 906 while in operation.

Figure 10:
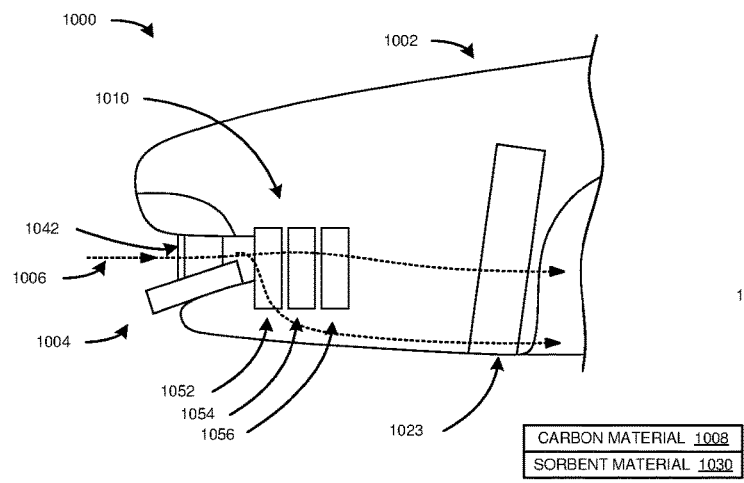
FIG. 10 depicts an embodiment of a carbon capture system having a plurality of the filter units.

FIG. 10 illustrates an embodiment of a carbon capture system 1000 having a plurality of filter units 1010. The air entering an intake vent 1004 can be directed to a series of the filter units 1010 before an airflow 1006 is discharged out of the system through a discharge vent 1023. In this example, the carbon capture system 1000 can include a vehicle 1002, the intake vent 1004, and the filter units 1010. The motion of the vehicle 1002 can generate the airflow 1006.

The carbon capture system 1000 can be configured to use the different filter units 1010 for a variety of purposes. In some embodiments, the carbon capture system 1000 can include the filter units 1010 configured for different types of carbon material 1008. For example, the carbon capture system 1000 can include a first filter unit 1052 that is configured to capture carbon dioxide, a second filter unit 1054 configured to capture carbon monoxide, and a third filter unit 1056 configured to capture methane. The different filter units can be configured by changing the sorbent material 1030 to one optimized for the type of gas to be captured. Additionally, the different filter units can have different electrical elements to improve the electrochemical performance of the filter units.

Further, the different filter units can be configured to discharge the airflow to different locations. For example, the first filter unit 1052 can discharge the airflow 1006 toward the brakes for additional cooling, while the other filter units can discharge the airflow 1006 at other locations.

Figure 11:
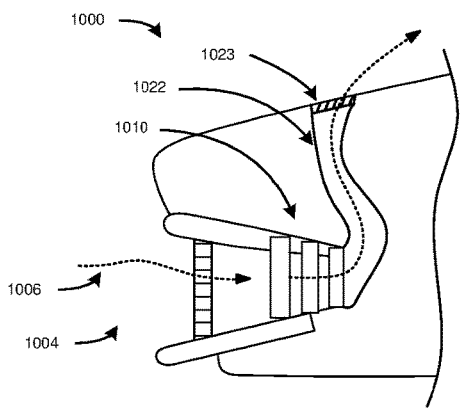
FIG. 11 depicts an embodiment of a carbon capture system having a plurality of the filter units.

FIG. 11 illustrates an embodiment of a carbon capture system 1000 having a plurality of filter units 1010. An airflow 1006 entering the intake vent 1004 can be directed to one or more of the filter units 1010 before the airflow 1006 is discharged out of the system through a discharge vent 1023 located on the hood of the vehicle 1002. The discharge vent 1023 can have a variety of configurations. For example, the discharge vent 1023 can be flush with the surface of the vehicle 1002, offset into the vehicle 1002, or have a protruding output area. The discharge vent 1023 can discharge the airflow 1006 in a particular direction using different structural elements including the orientation of a vent opening, vent vanes, or other similar elements.

Figure 12A:
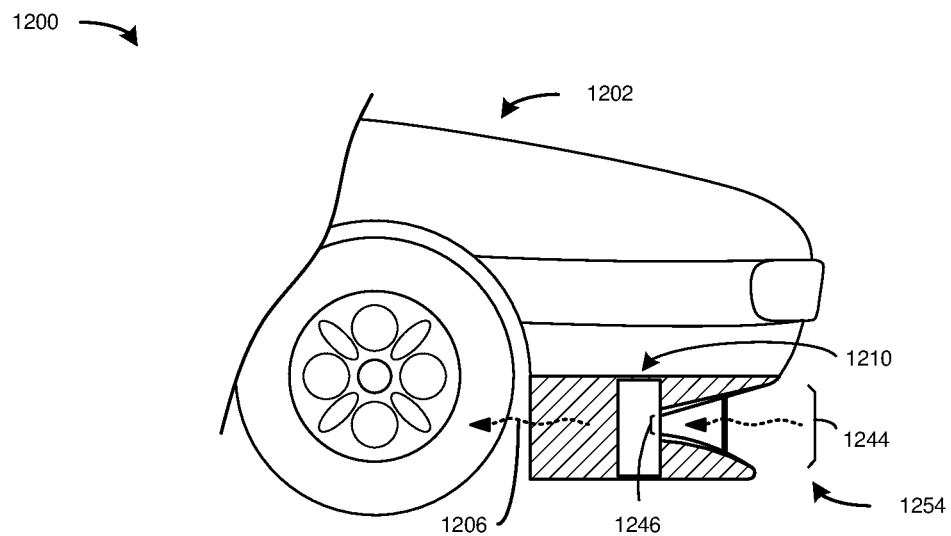
FIG. 12A depicts an embodiment of a carbon capture system having a chin spoiler.

FIG. 12A illustrates an embodiment of a carbon capture system 1200 having a chin spoiler 1254. The chin spoiler 1204 can direct the exterior air into a filter unit 1210 for carbon capture.

The chin spoiler 1254 is an air deflector unit that can act as an intake vent 1204 for a vehicle 1202. The chin spoiler 1254 can be more aerodynamic and help reduce drag underneath the vehicle 1202. The external air entering the chin spoiler 1254 can be directed to the filter unit 1210 before an airflow 1206 is discharged out of the system. In this example, the carbon capture system 1200 can include the vehicle 1202, the chin spoiler 1254, and the filter unit 1210. The motion of the vehicle 1202 can generate the airflow 1206.

In some embodiments, the airflow 1206 can enter through the chin spoiler 1254, pass through the filter unit 1210, and then discharge below the body of the vehicle 1202 and toward the brakes. This can provide additional cooling for the braking components.

In other embodiments, the filter unit 1210 can be located behind the chin spoiler 1254. The chin spoiler 1254 and the filter unit 1210 can be an integral unit that can be installed on the vehicle 1202 to replace existing spoiler type structures on the vehicle 1202.

In an embodiment, the chin spoiler 1254 can have a narrowing configuration where a front cross-section area 1244 is larger than a filter cross-section area 1246 that can increase the air pressure entering the filter unit 1210.

Figure 12B:
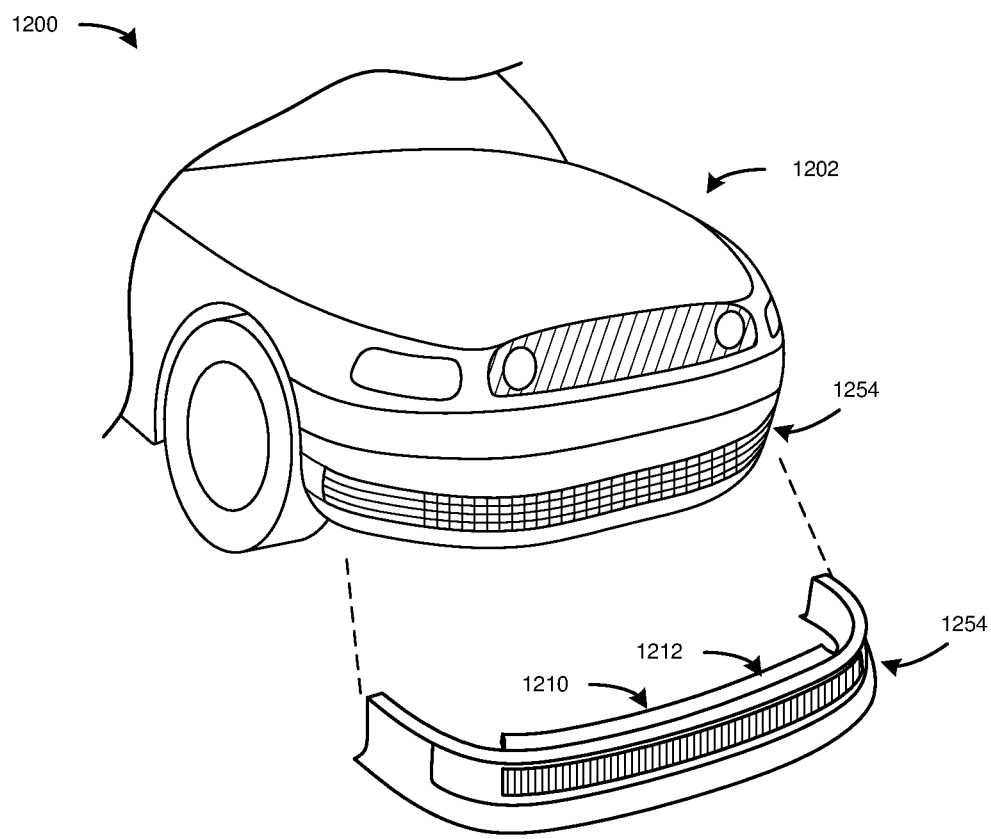
FIG. 12B depicts an embodiment of the carbon capture system having the chin spoiler.

FIG. 12B illustrates an embodiment of the carbon capture system 1200 having the chin spoiler 1254. The chin spoiler 1254 can be a custom formed unit for older vehicles. The chin spoiler 1254 can have a replaceable air capture box with a solid sorbent for carbon capture.

In some embodiments, the chin spoiler 1254 can include a valance spoiler 1256. The valance spoiler 1256 can include panels located below the bumper for aerodynamic purposes. The valence spoiler 1256 can help direct the airflow 1206 under the vehicle 1202 and to the filter unit 1210. The valance spoiler 1256 be attached to existing vehicles and can be configured with the filter unit 1210 for carbon capture.

The chin spoiler 1254 can include a customer flange to match the body of the vehicle 1202. The chin spoiler 1254 can include a filter box 1212 located behind the chin spoiler 1254 or the grill of the chin spoiler 1254 for carbon capture. The filter box 1212 can be customer sized to operate with the chin spoiler 1254. The filter box 1212 can be removed from the chin spoiler 1254 and processed similar to other filter box units. The chin spoiler 1254 can act as an air ram and use the air ram effect to increase the air pressure entering the filter box 1212.

Figure 13:
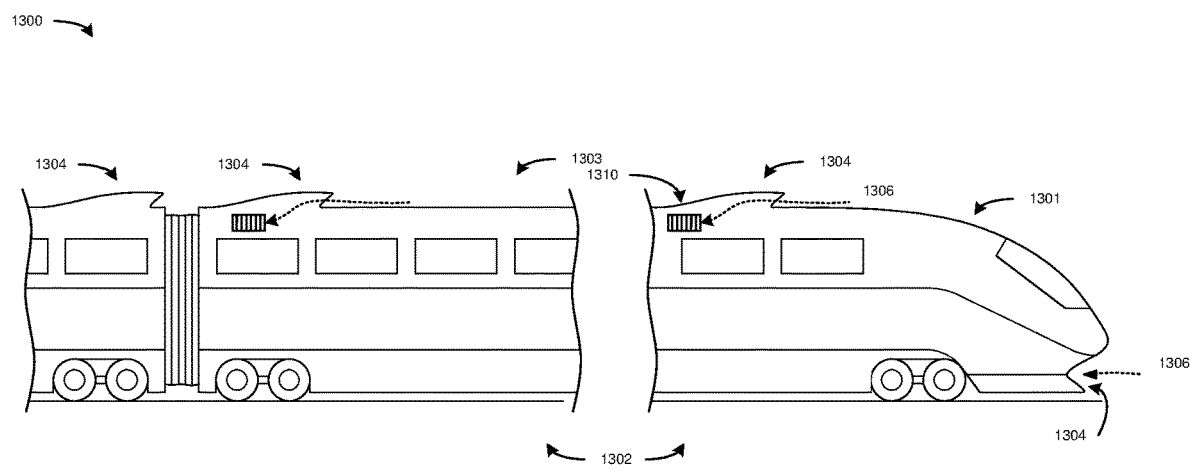
FIG. 13 depicts an embodiment of a carbon capture system with a train.

FIG. 13 illustrates an embodiment of a carbon capture system 1300 with a train 1302. The train 1302 can include a locomotive 1301 and optionally one or more train cars 1303.

The train 1302 can be a vehicle that operates on rails. The train 1302 can be a high-speed rail train, an electrically operated train, a diesel train, a trolley, subway train, regional transport train, cargo trains, or other similar types of railed vehicles. An illustrative example of the train 1302 can include the French Train à Grande Vitesse, or TGV. The TGV can operate at high speeds of up to several hundred kilometers per hour. The TGV utilizes an aerodynamic shape for efficient operation.

The train 1302 can be configured to include one or more of the train cars 1303. Each of the train cars 1303 can optionally include one or more of the carbon capture systems 1300. The train cars 1303 can be passenger cars, cargo cars, auxiliary locomotives, utility cars, or other types of similar cars to be attached to the locomotive.

In some embodiments, the train 1302 can be configured to include intake vents 1304 at the front of the locomotive 1301, on top of the locomotive 1301, on the top of the train cars 1303, on the sides of the train cars 1303, or other similar positions.

In these embodiments, the intake vents 1304 can act as air scoops or diverters to direct the airflow 1306 to the filter units 1310. The filter unit 1310 can be located in a unit behind the intake vents 1304, located within the body of the train 1302, or other similar locations. In this example, the carbon capture system 1300 can include the train 1302, the intake vent 1304, and the filter units 1310. The motion of the vehicle, such as the train 1302, can generate the airflow 1306.

Because the locomotive 1301 and the train cars 1303 can be operated in a reverse direction, the intake vents 1304 on the top and sides of the train 1302 can be configured to rotate to face the direction of travel. For example, the intake vents 1304 can be mounted on rotating structural members that can manually or automatically change direction the intake vent 1304 is facing.

Figure 14:
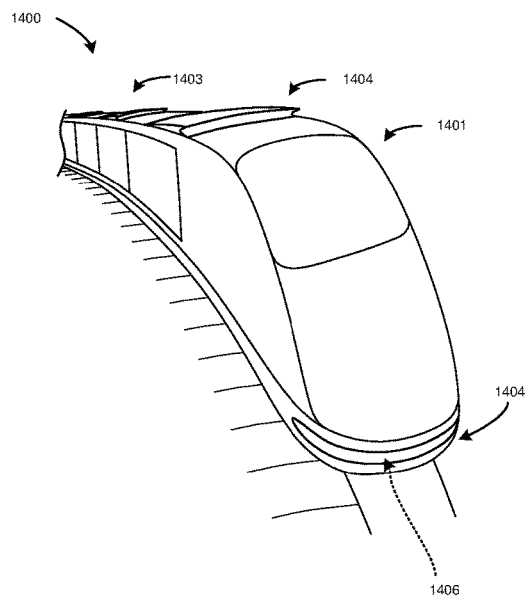
FIG. 14 depicts an embodiment of the carbon capture system with the train.

FIG. 14 illustrates an embodiment of a carbon capture system 1400 with the train 1402. The train 1402 can include a locomotive 1401 and optionally one or more train cars 1403.

The train 1402 can be configured to include the intake vent 1404 positioned on the top of the locomotive 1401 and on the top of the train cars 1403. The intake vent 1404 can extend from side to side across the top of the train 1402. The intake vent 1404 can direct the airflow 1406 to one or more of the filter units 1410 for carbon capture. The intake vent 1404 can be configured to increase the total filter air pressure 1450 in operation. The filter unit 1410 are as described in previous sections. In this example, the carbon capture system 1400 can include the train 1402, the intake vent 1404, and the filter units 1410. The motion of the vehicle, such as the train 1402, can generate the airflow 1406.

Figure 15:
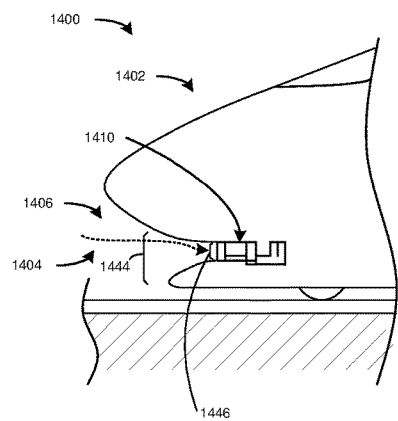
FIG. 15 depicts a side view of an embodiment of the carbon capture system with the train.

FIG. 15 illustrates a side view of an embodiment of the carbon capture system 1400 with the train 1402. The train 1402 can include the locomotive 1401 and optionally one or more train cars 1403.

The locomotive 1401 can include the intake vent 1404 located at the lower portion of the front of the locomotive 1401. The intake vent 1404, such as a chin spoiler, can direct the airflow 1406 to the filter unit 1410 for carbon capture.

In some embodiments, the front cross-section area 1444 of the intake vent 1404 can be larger than the filter cross-section area 1446. The difference in the cross-section areas can result in a higher total air pressure at the filter unit 1410 based on the motion of the train 1402. The compression of the airflow 1406 as it moves from the intake vent 1404 to the filter unit 1410 can raise the total filter air pressure 1450. The total air pressure can be a combination of the static air pressure and the dynamic air pressure.

In different embodiments, the carbon capture system 1400 can use a ram-air intake configuration. The ram-air intake configuration is where the motion of the train 1402 causes an increase in dynamic air pressure component and can increase the static air pressure inside at the filter unit 1410. The increased pressure at the filter unit 1410 can improve the carbon capture performance of the carbon capture system 1400.

Figure 16:
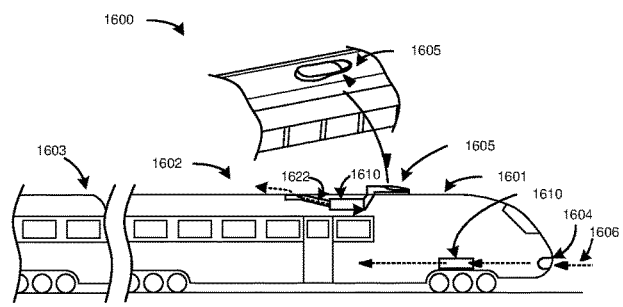
FIG. 16 depicts a side view of an embodiment of the carbon capture system with intake vents on the train.

FIG. 16 illustrates a side view of an embodiment of the carbon capture system 1600 with intake vents 1604 with the train 1602. The train 1602 can include the locomotive 1601 and optionally one or more train cars 1603.

In an embodiment, the train 1602 can include retractable intake vents 1605. the retractable intake vents 1605 can be positioned at the top of the train 1602, such as the top of the locomotive 1601 or train cars 1603. The retractable intake vent 1605 can extend or flip up during operation to facilitate directing the airflow 1606 to the filter unit 1610. The retractable intake vent 1605 can be retracted or flipped down when not in use to improve the aerodynamic profile of the train 1602. In this example, the carbon capture system 1600 can include the train 1602, the retractable intake vents 1605, and the filter unit 1610. The motion of the vehicle, such as the train 1602, can generate the airflow 1606.

In operation, the retractable intake vents 1605 can direct the airflow 1606 to the filter unit 1610 either directly or via an airflow duct 1622. The filter unit 1610 can be located below the retractable intake vent 1605 and within the body of the train 1602. The filter unit 1610 can be similar to the units described in previous sections.

Figure 17:
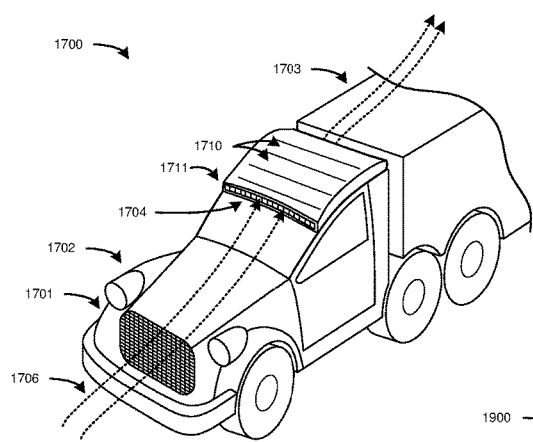
FIG. 17 depicts a view of an embodiment of the carbon capture system with a truck.

FIG. 17 illustrates a view of an embodiment of the carbon capture system 1700 with a truck 1702. The truck 1702 can include a tractor 1701 and optionally one or more trailers 1703. The truck 1702 can be an electric vehicle, diesel powered, gasoline powered, hybrid, or a similar vehicle type.

The carbon capture system 1700 can be configured in a variety of ways. In one configuration, the system can include an integrated unit 1711 having an intake vent 1704 positioned on the top of the tractor 1701 and a filter unit 1710 positioned behind the intake vent 1704 to receive an airflow 1706. The integrated unit 1711, such as a capture filter, can form an air diverter to make the truck 1702 more aerodynamic by providing a smoother surface to divert the air over the cab and over the top of the trailers 1703. In this example, the carbon capture system 1700 can include the truck 1702, the intake vent 1704, and the filter unit 1710. The motion of the vehicle, such as the truck 1702, can generate the airflow 1706. In some embodiments, the integrated unit 1711 can be configured as part of the roof of the tractor 1701 or as an aftermarket unit. The bottom of the integrated unit 1711 can be flush with the top of the tractor 1701 to eliminate any gap between the integrated unit 1711 and the tractor 1701.

In another embodiment, the truck 1702 can be configured with the intake vent 1704 behind the grill or at the lower portion of the front of the truck 1702. The intake vent 1704 can direct the air to one or more of the filter units 1710 and direct the airflow 1706 to the brakes for additional cooling.

Figure 18:
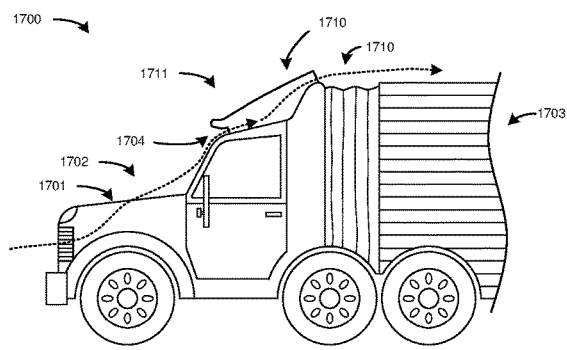
FIG. 18 depicts a side view of the carbon capture system with the truck.

FIG. 18 illustrates a side view of the carbon capture system 1700 with the truck 1702. The integrated unit can be attached to the top of the cab of the tractor 1701. The integrated unit 1711 can direct the external airflow over the top of the cab of the tractor 1701 and over the top of the trailers 1703.

The integrated unit can include the intake vent 1704 and one or more of the filter units 1710 behind the intake vent 1704. The integrated unit 1711 can form an aerodynamic surface for diverting the external air over the cab of the tractor 1701 and the trailer 1703.

Figure 19:
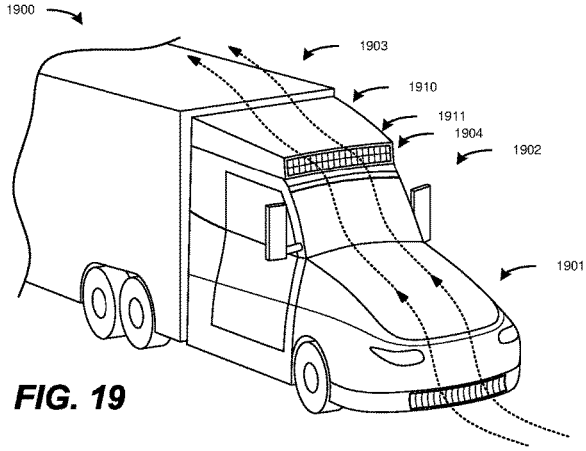
FIG. 19 depicts a view of an embodiment of the carbon capture system with the truck.

FIG. 19 illustrates a view of an embodiment of the carbon capture system 1900 with a truck 1902. The carbon capture system 1900 can include an integrated unit 1911 attached to the top of the cab of the tractor 1901. The integrated unit 1911 can direct the external airstream over the top of the cab of the tractor 1901 and over the top of the trailers 1903. In this configuration, the integrated unit 1911 can form a solid shape over the top of the cab of the tractor 1901 and be mounted flat on the top of the cab. The integrated unit 1911 can include an intake vent 1904 positioned at the front of the unit that can direct an airflow 1906 to the filter units 1910 within the integrated unit 1911 and then discharge the airflow 1906 over the top of the cab of the tractor 1901 and the top of the trailer 1903. The intake vent 1904 of the integrated unit 1911 can receive the external air flowing over the hood and windshield of the tractor 1901. In this example, the carbon capture system 1900 can include the truck 1902, the intake vent 1904, and the filter unit 1910. The motion of the vehicle, such as the truck 1902, can generate the airflow 1906. In some embodiments, the carbon capture system 1900 can be attached to existing trucks as a retrofit installation.

In another embodiment, one of the intake vents 1904 can be positioned at the lower portion of the front of the cab of the tractor 1902. The airflow 1906 can be directed to the filter units 1910 behind the intake vent 1904. Alternatively, the airflow 1906 can be directed upward and over the hood of the cab of the tractor 1901.

Figure 20:
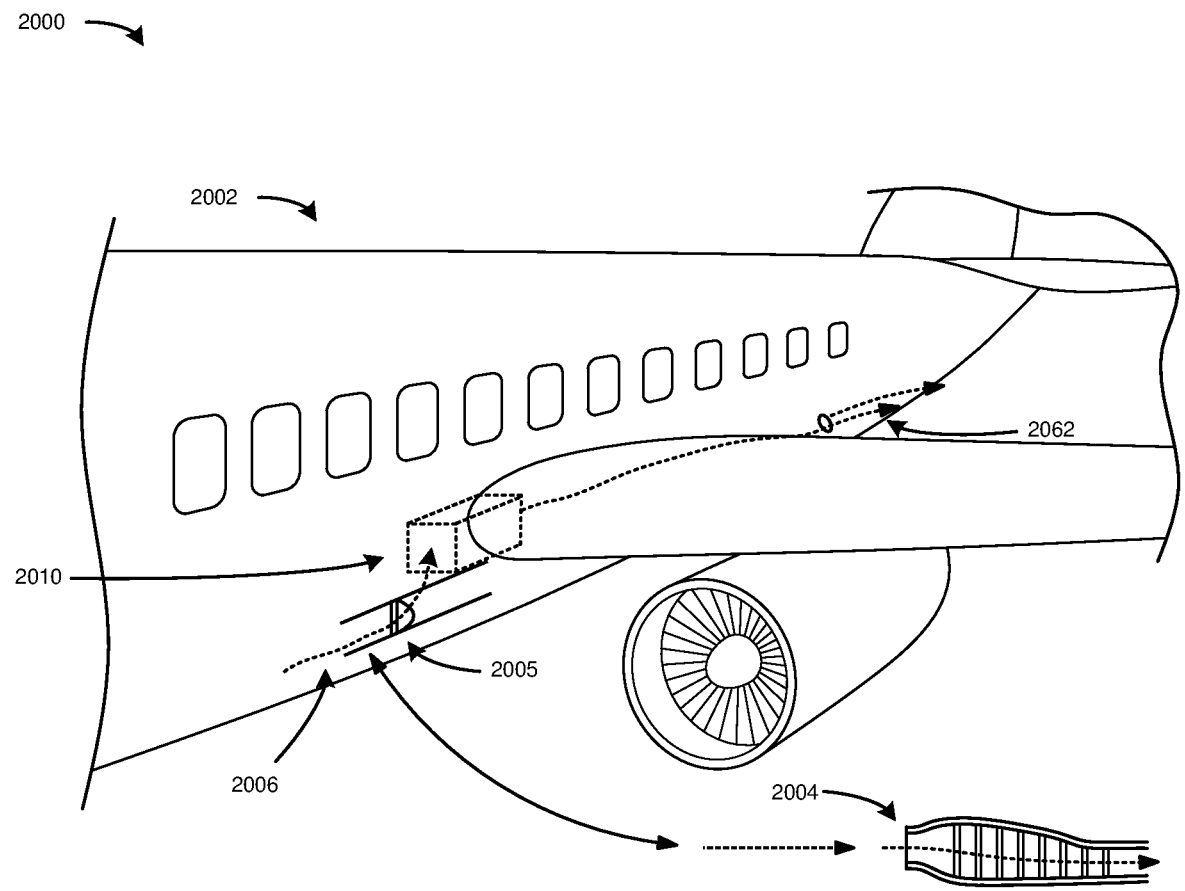
FIG. 20 depicts a view of an embodiment of a carbon capture system with the truck.

FIG. 20 illustrates an embodiment of a carbon capture system 2000 with an aircraft 2002. The carbon capture system 2000 can include an intake vent 2004 on the side of the fuselage of the aircraft 2002. The intake vent 2004 can direct an airflow 2006 to a filter unit 2010 positioned within the body of the aircraft 2002 and discharge the airflow 2006 at the rear of the aircraft 2002 through an outlet vent 2062. In this example, the carbon capture system 2000 can include the aircraft 2002, the intake vent 2004, and the filter unit 2010. The motion of the vehicle, such as the aircraft 2002, can generate the airflow 2006.

The intake vent 2004 can operate in an area of laminar flow adjacent to the body of the aircraft 2002. This can allow the incoming air to smoothly flow into the intake vent 2004. In some embodiments, the intake vent 2004 can be configured as a U.S. National Advisory Committee for Aeronautics (NACA) scoop or a NACA duct or NACA inlet. The NACA duct is a low-drag air inlet design. The NACA duct can increase the flow rate of air though the duct while not disturbing the boundary layer, maintaining laminar airflow, and minimizing the increase in drag.

The outlet vent 2062 can be positioned behind the filter unit 2010. The outlet vent 2062 can be an open or retractable structural element. In an example, the outlet vent 2062 can include a flap that can cover the outlet vent 2062 when the carbon capture system 2000 is not in operation. The outlet vent 2062 can be positioned on the side, top, or rear of the aircraft 2002.

In an embodiment, the aircraft 2002 can include retractable intake vents 2005. The retractable intake vents 2005 can be positioned at the sides of the fuselage of the aircraft 2002. The retractable intake vent 2005 can extend outward during operation to facilitate directing the airflow 2006 to the filter unit 2010. The retractable intake vent 2005 can be retracted when not in use to improve the aerodynamic profile of the train 2002. The retractable intake vent 2005 can be a retracting NACA vent that can retract into the fuselage of the aircraft 2002.

In operation, the retractable intake vents 2005 can direct the airflow 2006 to the filter unit 2010 either directly or via an airflow duct 2022. The airflow duct 2022 can run the body of the fuselage, such as through the lower luggage compartment of the aircraft 2002.

The filter unit 2010 can be located behind the retractable intake vent 2005 and within the body of the aircraft 2002. The filter unit 2010 can be similar to the units described in previous sections.

Figure 21:
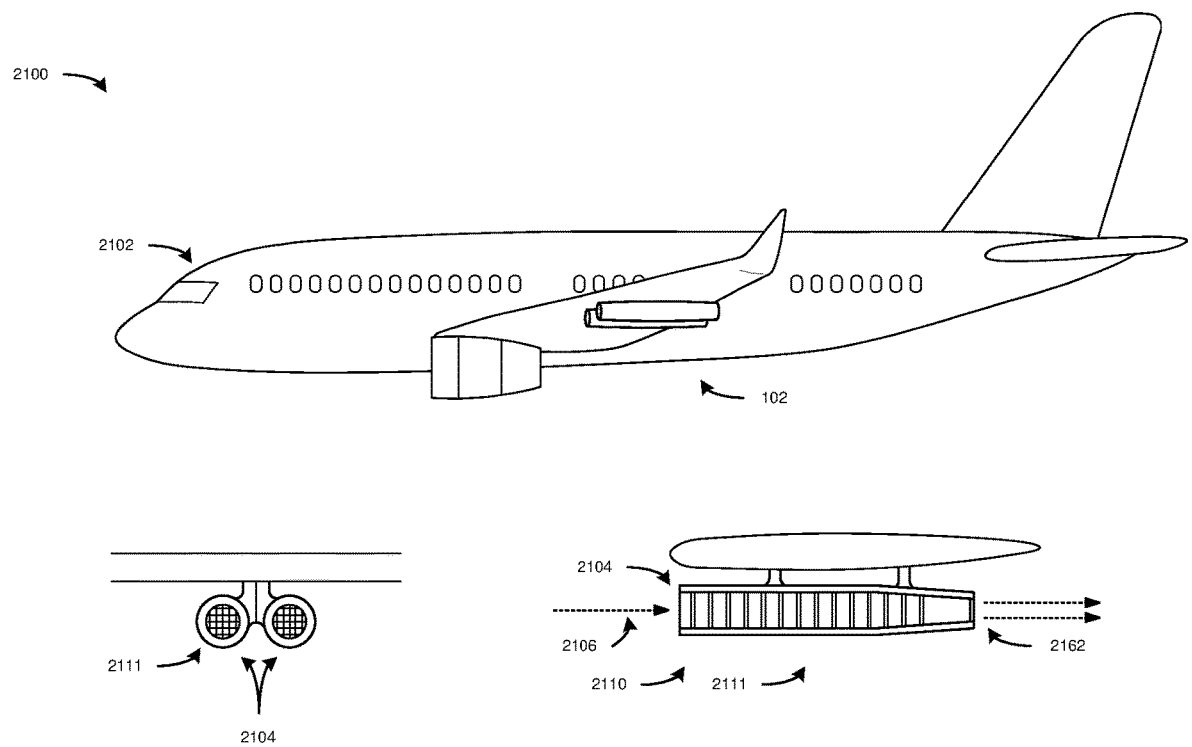
FIG. 21 depicts an embodiment of a carbon capture system with an aircraft.

FIG. 21 illustrates an embodiment of a carbon capture system 2100 with an aircraft 2102. The carbon capture system 2100 can include a filter unit 2110 in one or more external pods 2111 attached to the wings of the aircraft 2102.

The external pods 2111 can be mounted under the wings of the aircraft 2102. The external pods 2111 can be mounted in a single or double configuration. Each of the external pods 2111 can include an intake vent 2104 that can direct an airflow 2106 through one or more filter units 2110 within the external pods 2111. After passing through the filter unit 2110, the airflow 2106 can exit the external pods 2111 through an outlet vent 2162. The external pods 2111 can be coupled to the wings of the aircraft 2102 in a variety of ways. The external pods 2111 can be attached to the aircraft 2102 with a quick release system (not shown) to enable the externals pods 2111 to be quickly exchanged and replaced with a fresh one of the external pods 2111. The external pods 2111 can be configured to In this example, the carbon capture system 2100 can include the aircraft 2102, the intake vent 2104, and the filter units 2110. The motion of the vehicle, such as the aircraft 2102, through the air can create an airflow 2106 through the external pods 2111. The airflow 2106 can cause an air ram effect which can increase the air pressure 2124 at the filter unit 2110.

4.0. FUNCTIONAL OVERVIEW

Figure 22:
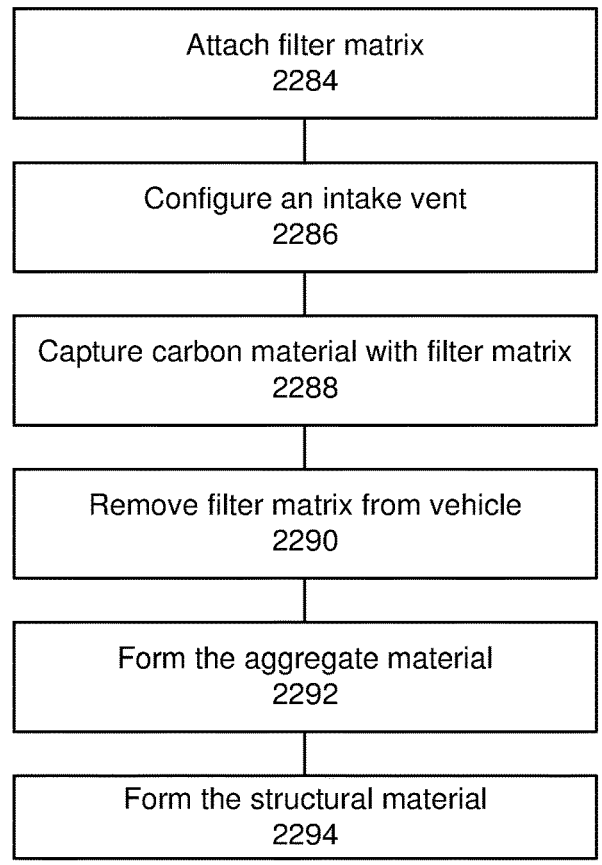
FIG. 22 depicts an example of an operation process flow.

FIG. 22 illustrates an operational process flow 2280 for a carbon capture system 2200. The operational process flow 2280 can describe the steps and process for operating the carbon capture system 2200.

The operational process flow 2280 can include a variety of operations. In an illustrative embodiment, the operational process flow 2280 can include an attach filter matrix step 2284, a configure intake vent step 2286, a capture carbon material step 2288, a remove filter matrix step 2290, a form aggregate material step 2292, and a form structural material step 2294.

In the attach filter matrix step 2284, a filter box 2212 having a filter matrix 2214 can be attached to a filter unit 2210 of a vehicle 2202. The filter matrix 2214 can include the filter fibers 2220 and are treated with a sorbent material 2230 for capturing carbon material 2208. In another embodiment, the filter matrix 2214 can be attached to the filter unit 2210.

Attaching the filter matrix 2214 to the vehicle 2202 can include bolting, fastening, welding, gluing, epoxying, or other methods of coupled two elements. Attaching the filter unit 2210 includes attaching the filter matrix 2214 and the filter fibers 2220 to the vehicle 2202.

In the configure intake vent step 2286, an intake vent 2204 can be positioned on the vehicle 2202 and can be configured to collect external air into an airflow 2206 and direct the airflow 2206 to the filter unit 2210. Configuring the intake vent 2204 can include positioning and aligning the intake vent 2204, optionally extending a retractable intake vent 2205 into the external airstream, opening and adjusting an airflow duct 2222, and optionally opening and adjusting a discharge vent 2223. Configuring the intake vent 2204 can also include modifying any of the electrical or mechanical operational elements including heating element, pumps, vents, vanes, or other elements that make modifications to the airflow 2206.

In the capture carbon material step 2288, the airflow 2206 can be directed to the filter unit 2210 and the filter fibers 2220 of the filter matrix 2214. The sorbent material 2230 of the filter matrix 2214, such as the filter fibers 2220 or other similar elements, can interact with the carbon material 2208 of the airflow 2206 to form the carbon loaded material 2238 within the filter fibers 2220.

In the remove filter matrix step 2290, a filter box 2212 having the filter matrix 2214 can be removed from within the filter unit 2210. The filter box 2212 is a removable element that can be replace at regular or irregular intervals.

In the form aggregate material step 2292, the filter matrix 2214 can be converted into the aggregate material 2252 by mechanically disassembling and cutting the filter matrix 2214 into pieces. The aggregate material 2252 can include the aggregate fibers 2272 formed from the filter fibers 2220 that can be at least partially converted into the carbon loaded material 2238 where the sorbent material 2230 has captured carbon material 2208 from the airflow 2206.

In the form structural material step 2294, a structural material 2254 can be formed by combining the aggregate material 2252 with a binder 2260. The structural material 2254 can have a variety of configurations, such as a fiber reinforced concrete. Once the structural material 2254 has been formed, it can be utilized to for structural components such as floors, walls, blocks, roads, or other similar elements.

Other examples of these and other embodiments are found throughout this disclosure.

5.0 EXAMPLE EMBODIMENTS

Examples of some embodiments are represented, without limitation, in the following clauses and use cases:

According to an embodiment, a method of operation of a carbon capture system comprises attaching a filter matrix to a vehicle for extracting carbon material from an airflow caused by the motion of the vehicle, the filter matrix having a sorbent material for capturing carbon material from the airflow, directing an airflow through an intake vent and to the filter matrix having the sorbent material, capturing a portion of the carbon material in the airflow with the sorbent material of the filter matrix by forming a carbon loaded material at the filter matrix.

In an embodiment, the method further comprises forming an aggregate material at least partially comprising the carbon loaded material of the filter matrix and combining the aggregate material with a binding material to form a composite material.

In an embodiment, the method further comprises the forming the composite material includes forming the composite material using a mixture of the aggregate material and cement.

In an embodiment, the method further comprises the attaching the filter matrix includes forming the filter matrix by binding filter fibers together.

In an embodiment, the method further comprises attaching the filter matrix to a filter unit positioned in the airflow from the intake vent.

In an embodiment, the method further comprises processing the carbon loaded material of the filter matrix into aggregate fibers and forming a structural material by combining the aggregate fibers with a binder.

In an embodiment, the method further comprises the binder is cement or a resin.

In an embodiment, the method further comprises the attaching the filter matrix include forming the filter matrix with a sorbent-enhanced fiber and a structural fiber.

In an embodiment, the method further comprises the aggregate fibers having carbon loaded fibers and fibers with a higher tensile strength than the carbon loaded fibers.

In an embodiment, the method further comprises attaching the filter matrix to an automobile, a truck, a train, an aircraft, or a windmill blade.

According to an embodiment, a carbon capture system comprises a sorbent material for capturing carbon material, a filter matrix attached to a vehicle for extracting carbon material from an airflow caused by the motion of the vehicle, the filter matrix having the sorbent material for capturing carbon material from the airflow, an intake vent on the vehicle for directing an airflow through the filter matrix having the sorbent material, a portion of the carbon material in the airflow forming a carbon loaded material with the sorbent material of the filter matrix.

In an embodiment, the system further comprises an aggregate material at least partially formed from the carbon loaded material of the filter matrix, a binding material combined with the aggregate material for forming a composite material.

In an embodiment, the system further comprises a composite material formed with a mixture of the aggregate material and cement.

In an embodiment, the system further comprises the filter matrix includes filter fibers bound together.

In an embodiment, the system further comprises the filter matrix is attached to a filter unit positioned in the airflow from the intake vent.

In an embodiment, the system further comprises a structural material formed from the aggregate fibers from the carbon loaded material of the filter matrix and a binder.

In an embodiment, the system further comprises the binder is cement or a resin.

In an embodiment, the system further comprises the filter matrix includes a sorbent-enhanced fiber and a structural fiber.

In an embodiment, the system further comprises the aggregate fibers include carbon loaded fibers and fibers with a higher tensile strength than the carbon loaded fibers.

In an embodiment, the system further comprises the vehicle is an automobile, a truck, a train, an aircraft, or a windmill blade.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being coupled to various other components by arrows. These arrows illustrate only certain examples of air flows between or through the components. Neither the direction of the arrows nor the lack of arrow lines between certain components should be interpreted as indicating the existence or absence of a flow between the certain components themselves.

In the specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this system, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

It is understood that the system functionality can be described using terms like module, unit, system, subsystem, pod, and component that represent devices that can be implemented using different combinations of mechanical, hardware, firmware, and software elements. The systems and devices can include electric subsystems, mechanical subsystems, and other physical elements to operate and control the system. These elements can include computing elements that can execute the firmware and software of the system to control mechanical features of the system. In addition, the mechanical elements of the system can operate with or without control mechanisms in regular operation.

What is claimed is:

1. A method of operation of a carbon capture system comprising:
    attaching a filter matrix to a vehicle for extracting carbon material from an airflow caused by the motion of the vehicle, the filter matrix formed from filter threads having a first fiber and a second fiber, the first fiber formed from a sorbent absorbent material, the second fiber having a higher tensile strength than the first fiber, the filter threads having a hook shape on at least one end to help couple to other fibers, the filter matrix having a sorbent material for capturing carbon material from the airflow;
    directing an airflow through an intake vent and to the filter matrix having the sorbent material; and
    capturing a portion of the carbon material from the airflow with the sorbent material of the filter matrix by forming a carbon loaded material at the filter matrix.

2. The method as claimed in claim 1 further comprising forming an aggregate material at least partially comprising the carbon loaded material of the filter matrix and combining the aggregate material with a binding material to form a composite material.

3. The method as claimed in claim 2 wherein forming the composite material includes forming the composite material using a mixture of the aggregate material and cement.

4. The method as claimed in claim 1 wherein attaching the filter matrix includes forming the filter matrix by binding the filter threads together.

5. The method as claimed in claim 1 wherein attaching the filter matrix includes attaching the filter matrix to a filter unit positioned in the airflow from the intake vent.

6. The method as claimed in claim 1 further comprising processing the carbon loaded material of the filter matrix into aggregate fibers and forming a structural material by combining the aggregate fibers with a binder.

7. The method as claimed in claim 6 wherein the binder is cement or a resin.

8. The method as claimed in claim 6 wherein attaching the filter matrix includes forming the filter matrix with a sorbent-enhanced fiber and a structural fiber.

9. The method as claimed in claim 6 wherein the aggregate fibers include carbon loaded fibers and fibers with a higher tensile strength than the carbon loaded fibers.

10. The method as claimed in claim 6 wherein attaching the filter matrix includes attaching the filter matrix to an automobile, a truck, a train, or an aircraft.

11. A carbon capture system comprising:
a sorbent material for capturing carbon material;
a filter matrix attached to a vehicle for extracting carbon material from an airflow caused by the motion of the vehicle, the filter matrix formed from filter threads having a first fiber and a second fiber, the first fiber formed from a sorbent absorbent material, the second fiber having a higher tensile strength than the first fiber, the filter threads having a hook shape on at least one end to help couple to other fibers, the filter matrix having the sorbent material for capturing carbon material from the airflow; and
an intake vent on the vehicle for directing an airflow through the filter matrix having the sorbent material, a portion of the carbon material from the airflow forming a carbon loaded material with the sorbent material of the filter matrix.

12. The system as claimed in claim 11 further comprising:
an aggregate material at least partially formed from the carbon loaded material of the filter matrix; and
a binding material combined with the aggregate material for forming a composite material.

13. The system as claimed in claim 12 further comprising a composite material formed with a mixture of the aggregate material and cement.

14. The system as claimed in claim 11 wherein the filter matrix includes filter threads bound together.

15. The system as claimed in claim 11 wherein the filter matrix is attached to a filter unit positioned in the airflow from the intake vent.

16. The system as claimed in claim 11 further comprising a structural material formed from aggregate fibers from the carbon loaded material of the filter matrix and a binder.

17. The system as claimed in claim 16 wherein the binder is cement or a resin.

18. The system as claimed in claim 16 wherein the filter matrix includes a sorbent-enhanced fiber and a structural fiber.

19. The system as claimed in claim 16 wherein the aggregate fibers include carbon loaded fibers and fibers with a higher tensile strength than the carbon loaded fibers.

20. The system as claimed in claim 16 wherein the vehicle is an automobile, a truck, a train, or an aircraft.

* * * * *